United States Patent

[11] 3,551,753

| [72] | Inventor | Carl E. Atkins<br>Montclair, N.J. |
|---|---|---|
| [21] | Appl. No. | 710,855 |
| [22] | Filed | Mar. 6, 1968 |
| [45] | Patented | Dec. 29, 1970 |
| [73] | Assignee | Wagner Electric Corporation<br>a corporation of Delaware |

[54] THREAD END DETECTOR
10 Claims, 4 Drawing Figs.

[52] U.S. Cl. .................................................. 317/146,
340/259; 317/154; 57/81
[51] Int. Cl. ...................................................... H01h 47/12,
H01h 47/04; G08b 21/00
[50] Field of Search ............................................ 340/259,
260, (Inquired); 317/123, 146, 154, 123PL;
57/81, 61.14; 200/61.13, 61.41

[56] References Cited
UNITED STATES PATENTS

| 3,435,298 | 3/1969 | Atkins et al. | 317/146 |
| 3,249,821 | 5/1966 | Shillington | 317/142 |
| 3,052,878 | 9/1962 | Berry | 340/282 |
| 2,400,837 | 5/1946 | Nesterowicz | 66/162 |
| 3,146,431 | 8/1964 | Betts | 340/259 |

*Primary Examiner*—J. D. Miller
*Assistant Examiner*—C. L. Yates
*Attorney*—Eyre, Mann & Lucas ABSTRACT: A detector is described for sensing a conductive portion on a thread and then activating an indicator which remains active after the conductive portion has left the sensing station. The circuit includes a relaxation oscillator, a semiconductor switch, a relay and an indicating means. A normalizing switch may be operated to return the circuit to its original condition.

PATENTED DEC 29 1970　　　　　　　　　　　　3,551,753

INVENTOR.
CARL E. ATKINS
BY Eyre, Mann & Lucas

ATTORNEYS

THREAD END DETECTOR

The invention relates to a fast-acting detecting means for sensing a conductive portion of a normally nonconducting thread as it passes through a sensing station. The invention has particular reference to a means for detecting the end of a length of thread on a bobbin in a sewing machine, but it can be used in many other applications.

For many applications, and particularly in sewing machines, it is desirable to notify an operator when the end of the thread passes through the machine. Generally, the thread moves quite fast and the sensing means must be able to operate even though the pulse it receives is less than 0.01 second in duration. The conductive portion of the thread may be provided by applying conductive paint to the thread or it may be wrapped with conductive foil. Prior detectors have been made which operated mechanically by sensing an enlarged portion of the thread or by sensing the absence of the thread.

For a better understanding of the present invention, together with other details of operation reference is made to the following description taken in connection with the accompanying drawings.

FIG. 1. is a schematic diagram of connections of the sensing and indicating circuit.

FIG. 2. is a perspective drawing of one form of sensing means for determining the passage of a conductive portion of the thread.

Figure 1:
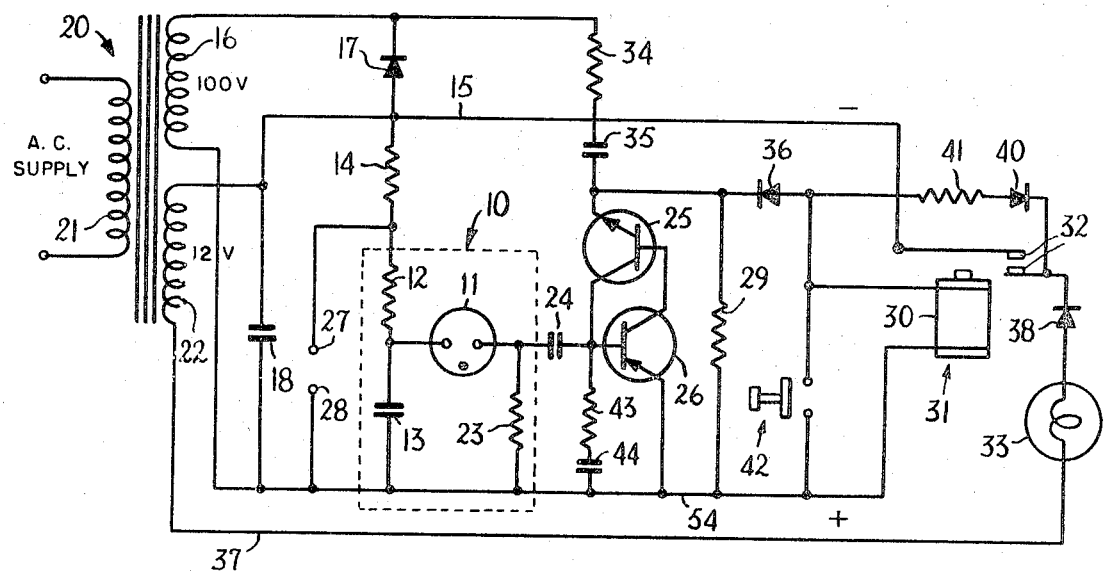

Referring now to FIG. 1, the circuit includes a source of DC power comprising diode 17 and capacitor 18 connected in series across the terminals of secondary winding 16 of transformer 20. Limiting resistor 14 connects the junction of diode 17 and capacitor 18 to the input terminal of a low-frequency relaxation oscillator 10, which includes a resistor 12 and a capacitor 13 connected in series between the input terminal and the low side of capacitor 18, and a gas-filled tube 11 and a resistor 23 connected in series across capacitor 13. The output of the relaxation oscillator consists of a continuous train of negative pulses, and is derived from the u junction of resistor 23 and gas-filled tube 11. The oscillator output is applied through blocking capacitor 24 to a semiconductor switching combination which includes a first transistor 25 and a second transistor 26, the base of transistor 25 being connected to the collector electrode of transitor 26 and, in like manner, the base of transistor 26 being connected to the collector electrode of transistor 25. In order to limit the current through transistor switch 25, 26 and minimize power dissipation and heat generation, a small resistor 34 and a large capacitor 35 are connected in series from the cathode of the transistor switch 25, 26 to one terminal winding 16, and the anode of the transistor switch 25, 26 is connected to the other terminal of winding 16.

The transistor switch 25, 26 requires a bias in order to operate properly. This bias is furnished by a resistor 43 and a blocking capacitor 44, this circuit being connected between the base electrode of transistor 26 and the emitter electrode. Leakage current passing through the emitter-collector junction of transistor 25 and resistor 43 during the positive half-cycles charges capacitor 44. The zener breakdown voltage of the bias emitter junction of transistor 26 limits the bias voltage across capacitor 44 to about 6 volts. This is the desired biasing voltage and it is maintained at this value as long as the alternating current is supplied from winding 16.

Resistor 29, connected across the anode and cathode of transistor switch 25, 26, serves to prevent voltage breakdown of the transistors switch during positive half-cycles of applied voltage. This resistor may be eliminated if transistors having relatively high junction breakdown voltages are employed.

Under normal circumstances, the output of the oscillator is applied to the semiconductor switch formed by s transistors 25, 26, making it conductive during negative half-cycles and thereby shunting a winding 30, which is part of a relay 31 having a normally open pair of contacts 32. During the positive half-cycle, diode 36 prevents the flow of current to the relay winding 30. Since the relay is not actuated, the load current path from one terminal of secondary winding 22 through conductor 15 to contacts 32, and through diode 38, lamp 33 and conductor 37 to the other terminal of winding 22 is not closed, and indicator lamp 33 is not lighted.

Secondary winding 22 is a low voltage winding of about 12 volts and is used only to light the indicator lamp 33. One side of the winding the winding running directly to one side of the lamp through conductor 37 while the other side of winding 22 is connected to common conductor 15. The lamp is connected in series with a diode 38 so that current from the 12-volt winding 16 passes through the contacts 32, diode 38, and the lamp to light it. A latching circuit which includes a diode 40 and a limiting resistor 41 connects the contacts 32 to the winding 30 to latch the relay in its operated condition and maintain the lamp lighted even though the conductive portion of the thread passes the sensing station and then normalizes the oscillating circuit and makes the transistor switch 25, 26 conductive again.

A normalized switch 42 is connected across the terminals of the relay winding 30. After the indicating means has been turned on by the operation of the circuit, the relay may be normalized by depressing switch 42 and short-circuiting the winding. Contacts 32 are thereby opened and the entire circuit is returned to its normal or original state.

Figure 2:
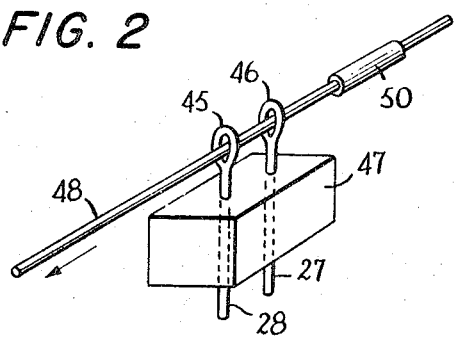

FIG. 2 shows one form of the sensing station. Two loops 45 and 46 are secured to a block of insulating material 47. The thread 48 is inserted through the loops and the bottom extensions of the loops are connected to terminals 27, 28 shown in the circuit in FIG. 1. When the conducting portion of the thread 50 is drawn through the loops, connection is made between the terminals and resistor 12 and capacitor 13 are then short-circuited and the oscillator is disabled.

Figure 3:
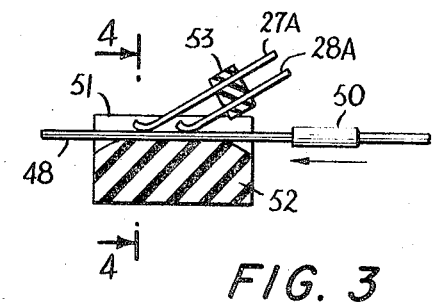
FIG. 3 is a cross-sectional view taken along line 3–3 of FIG. 4 and shows an alternate form of the sensing means.
Figure 4:
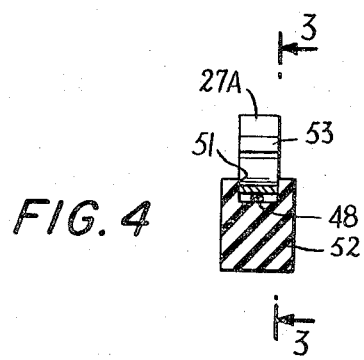
FIG. 4 is a cross-sectional view of the sensing station shown in FIG. 3 and is taken along line 4–4 of that FIG.

FIGS. 3 and 4 are cross-sectional views showing another form of sensing station. In this form the thread 48 passes over a channel 51 cut in an insulator block 52. On top of the thread two flexible conducting springs 27A and 28A press lightly on the thread 48. The springs are secured in position by means of an insulator block 53. As before, the conductive portion 50 of the thread connects the two springs together so that they short circuit a portion of the oscillator input circuit and cause it to stop oscillating.

The operation of the circuit has been partly described in the above description of the circuit. When the power is first applied to primary winding 21, alternating current voltage is applied to the semiconductor switch and negative pulses pass through diode 17 and create a direct current potential between conductors 15 and 54. The relaxation oscillator starts immediately and its output is applied to the semiconductor switch to make it conductive and short circuit the relay winding 30 and maintain contacts 32 open. When terminals 27 and 28 are connected by means of the conductive portion 50 of thread 48, the oscillator stops, the semiconductor switch is rendered nonconductive, and the first negative pulse passing through diode 36 and winding 30 actuates the relay, thereby closing contacts 32. As soon as contacts 32 close, a latching circuit, as described above, retains the relay in its actuated condition and maintains the indicator lamp 33 in its lighted condition.

The conductive portion of the thread may connect terminals 27, 28 for a very short time interval after which the oscillating circuit continues to oscillate and maintain the semiconductor switch in conductive condition. However, the relay remains in its actuated condition because of its latching circuit which may be traced from the positive conductor 54, through the relay winding 30 resistor 41, diode 40, contacts 32, and then to the negative conductor 15.

A preferred set of values for the various circuit components is a follows:

Transformer:

| | | |
|---|---|---|
| Primary Winding 21 | volts | 120 RMS |
| Secondary Winding 16 | do | 120 RMS |
| Secondary Winding 22 | do | 12 RMS |
| Resistor 12 | megohms | 3.9 |
| Resistor 14 | ohms | 220,000 |
| Capacitor 18 | microfarads | 8 |
| Resistor 23 | ohms | 27,000 |
| Capacitor 24 | microfarad | .01 |
| Resistor 29 | ohms | 68,000 |
| Resistor 34 | do | 470 |
| Capacitor 35 | microfarad | .1 |
| Resistor 41 | ohms | 22,000 |
| Resistor 43 | do | 33,000 |
| Capacitor 44 | microfarad | .01 |
| Transistor 25 | | 2N 3567 |
| Transistor 26 | | 2N 4248 |

The advantages of the present invention, as well as certain changes and modifications to the disclosed embodiment thereof, will be readily apparent to those skilled in the art. It is the applicant's intention to cover all those changes and modifications which could be made to the embodiments of the invention herein chosen for the purposes of the disclosure without departing from the spirit and scope of the invention.

I claim:

1. A conductivity-sensitive circuit comprising:
   a. first and second sensing terminals spaced to be electrically connected by a material the conductivity of which is to be sensed;
   b. control circuit means having a portion thereof electrically connected to said first and second sensing terminals said portion of said control circuit means being short-circuited when said sensing terminals are electrically connected, said control circuit means being operative to generate an output signal in response thereto;
   c. relay means connected to said control circuit means and operative in response to said output signal to close a load current path; and
   d. latching circuit means connected to said relay and operative upon actuation of said relay means by said output signal to cause said relay means to remain actuated after the removal of said output signal.

2. A conductivity-sensitive circuit according to claim 1, further including normalizing means for selectively deactuating said e relay means after said latching circuit means has become operative to maintain said relay means actuated.

3. A conductivity-sensitive circuit according to claim 1 which is responsive to a low resistance connected across said first and second sensing terminals for a period on the order of 0.01 seconds.

4. A conductivity-sensitive circuit according to claim 1 wherein said control circuit means comprises:
   a. AC to DC conversion circuit means having input and output terminals;
   b. oscillator circuit means having input and output terminals, said input terminals being connected to the output terminals of said AC to DC conversion circuit means and to said first and second sensing terminals;
   c. semiconductor switching means having anode, cathode and gate electrodes, said gate electrodes being connected to an output terminal of said oscillator circuit means, and said cathode and anode electrodes being connected in a current current-shunting path; and
   d. half-wave rectifying means the cathode of which is connected to the cathode of said semiconductor switching means, said rectifying means and said relay means being connected across said current-shunting path, wherein the output of said oscillator circuit means maintains said semiconductor switching means conductive when a high resistance is connected across said first and second sensing terminals, thereby shunting actuating current from said relay means during first half-cycles of the applied power, said first half-wave rectifying means being operative to block actuating current from said relay means during second half-cycles of the applied power, said first and second half-cycles of being of opposite polarity.

5. A conductivity-sensitive circuit according to claim 4, further including resistance means connected across said anode and cathode of said semiconductor switching ma means, said resistance means being operative to prevent voltage breakdown of said semiconductor switching means when positive voltages are applied to said cathode.

6. A conductivity-sensitive circuit according to claim 4 wherein an impedance is connected in series with said cathode of said semiconductor switching means, said impedance having a capacitive reactance component substantially larger than its resistive component at least at the fundamental frequency of the source of alternating current power.

7. A conductivity-sensitive circuit according to claim 4 wherein said oscillator circuit means comprises:
   1. first resistance means and capacitance means connected in series between the output terminals of said AC to DC conversion circuit means; and
   2. voltage breakdown means and second resistance means connected in series across said capacitance means, said oscillator circuit means being operative to generate pulses at the junction of said voltage breakdown means and second resistance means, said pulses being of sufficient magnitude to maintain said semiconductor switching means conductive when a high resistance is connected across said first and second sensing terminals, and being sufficiently diminished in magnitude to permit said semiconductor switching means to become nonconductive when a low resistance is connected across said first and second sensing terminals.

8. A conductivity-sensitive circuit according to claim 1 wherein:
   a. said relay means includes:
      1. an armature
      2. first and second contacts, said first contact being mounted on said armature, and
      3. a winding operative to exert electromagnetic force on said armature when energized;
   b. said latching circuit means includes resistance means connecting said second contact to one terminal of said winding.

9. A conductivity-sensitive circuit according to claim 1 wherein:
   a. said relay means includes:
      1. an armature,
      2. first and second contacts, said first contact being mounted on said armature, and
      3. a winding operative to exert electromagnetic force on said armature when energized; and
   b. said latching circuit means includes first half-wave rectifying means and resistance means connected in series between said second contact of said armature and one terminal of said winding of said relay means, said conductivity-sensitive circuit further including
      1. second half-wave rectifying means connected at one terminal to said second contact and to the like terminal of said first half-wave rectifying means, whereby when a load is connected between the other terminal of said second half-wave rectifying means and one terminal of a source of load current, and said first contact is connected to the other terminal of a source of load current, and said first and second contacts are closed, latching current will flow through said first and second contacts, said first half-wave rectifying means, said resistance means and said winding of said relay means, and load current will flow through said first and second contacts, said second half-wave rectifying means and said load, said first and second half-wave rectifying means being operative to prevent current flow through said load when said first and second contacts are open.

10. A conductivity-repsonsive circuit according to claim 1 further including transformer means comprising:
    a. a primary winding;

b. a first secondary winding; and
c. a second secondary winding; wherein when said primary winding is connected to a source of alternating current power and a load is connected in said load current path, said first secondary winding provides relatively high-voltage alternating current power to a said control circuit means and said second secondary winding provides relatively low-voltage alternating current power to said load when said relay means has closed said current load path.